(12) United States Patent
Mukherjee et al.

(10) Patent No.: US 10,452,625 B2
(45) Date of Patent: Oct. 22, 2019

(54) DATA LINEAGE ANALYSIS

(71) Applicant: GLOBAL IDS, INC., Princeton, NJ (US)

(72) Inventors: Arka Mukherjee, Princeton, NJ (US); Arka Sarkar, Kolkata (IN); William Presley Winkler, Dallas, TX (US)

(73) Assignee: GLOBAL IDS, INC., Princeton, NJ (US)

( * ) Notice: Subject to any disclaimer, the term of this patent is extended or adjusted under 35 U.S.C. 154(b) by 309 days.

(21) Appl. No.: 15/628,308

(22) Filed: Jun. 20, 2017

(65) Prior Publication Data
US 2018/0004781 A1 Jan. 4, 2018

Related U.S. Application Data

(60) Provisional application No. 62/356,928, filed on Jun. 30, 2016.

(51) Int. Cl.
*G06F 16/21* (2019.01)
*G06F 16/22* (2019.01)
(Continued)

(52) U.S. Cl.
CPC .......... *G06F 16/213* (2019.01); *G06F 16/214* (2019.01); *G06F 16/22* (2019.01);
(Continued)

(58) Field of Classification Search
CPC ...... G06F 16/213; G06F 16/214; G06F 16/22; G06F 16/24; G06F 16/26; G06F 16/248;
(Continued)

(56) References Cited

U.S. PATENT DOCUMENTS 6,343,295 B1 * 1/2002 MacLeod .............. G06F 16/219
6,434,558 B1 * 8/2002 MacLeod .............. G06F 16/284
(Continued)

OTHER PUBLICATIONS

Reisser et al., "Utilizing Semantic Web Technologies for Efficient Data Lineage and Impact Analyses in Data Warehouse Environments", 20th International Workshop on Database and Expert Systems Application, IEEE Computer Society, 2009, pp. 59-63. (Year: 2009).*

*Primary Examiner* — Phuong Thao Cao
(74) *Attorney, Agent, or Firm* — Mannava & Kang, P.C.; Vinay Malik

(57) ABSTRACT

According to an example of the present disclosure, a system and a computer-implemented method of tracing data flow are disclosed. The method includes profiling and classifying, by at least one processing device, domains based on features of columns containing data. Further, the method includes selecting a lineage analysis method that includes selecting a timestamp-based lineage method, when database tables for the domains include audit columns. The lineage analysis method includes selecting a stroboscopic-sampling based lineage method, when a semantic object and/or a column mapped to a domain is present. The lineage analysis method includes selecting a record-based lineage method, when a lineage between a source schema and a target schema is to be ascertained. The method includes executing the selected lineage method, and presenting lineage results.

25 Claims, 10 Drawing Sheets

(51) Int. Cl.
  *G06F 16/28* (2019.01)
  *G06F 16/24* (2019.01)
  *G06F 16/26* (2019.01)
  *G06F 16/248* (2019.01)
  *G06F 16/955* (2019.01)

(52) U.S. Cl.
  CPC ........ *G06F 16/221* (2019.01); *G06F 16/2282* (2019.01); *G06F 16/24* (2019.01); *G06F 16/248* (2019.01); *G06F 16/26* (2019.01); *G06F 16/283* (2019.01); *G06F 16/287* (2019.01); *G06F 16/9566* (2019.01)

(58) Field of Classification Search
  CPC .. G06F 16/283; G06F 16/287; G06F 16/2282; G06F 16/221; G06F 16/9566
  USPC ........................................................ 707/722
  See application file for complete search history.

(56) References Cited

U.S. PATENT DOCUMENTS

| | | | | |
|---|---|---|---|---|
| 7,725,433 | B1* | 5/2010 | Labrie | G06F 16/213 707/612 |
| 9,384,231 | B2* | 7/2016 | Benjamin | G06Q 40/00 |
| 9,767,100 | B2* | 9/2017 | Bator | G06F 16/26 |
| 2005/0015377 | A1* | 1/2005 | Wan | G06F 16/254 |
| 2005/0165865 | A1* | 7/2005 | Farmer | G06F 16/283 |
| 2009/0030880 | A1* | 1/2009 | Melamed | G06F 16/25 |
| 2010/0138420 | A1* | 6/2010 | Bator | G06F 16/26 707/737 |
| 2011/0066602 | A1* | 3/2011 | Studer | G06F 17/2264 707/690 |
| 2012/0191703 | A1* | 7/2012 | Huff | G06Q 10/063 707/722 |
| 2013/0006968 | A1* | 1/2013 | Gusmini | G06F 16/25 707/722 |
| 2013/0332423 | A1* | 12/2013 | Puri | G06F 16/219 707/687 |
| 2014/0114907 | A1* | 4/2014 | Kozina | G06F 16/283 707/602 |
| 2014/0358829 | A1* | 12/2014 | Hurwitz | G06N 20/00 706/12 |
| 2014/0379665 | A1* | 12/2014 | Benjamin | G06Q 40/00 707/687 |
| 2015/0356123 | A1* | 12/2015 | Gorelik | G06F 16/2465 715/765 |
| 2016/0085752 | A1* | 3/2016 | Von Weihe | G06F 17/2288 707/722 |
| 2016/0098390 | A1* | 4/2016 | Kitajima | G06F 17/2765 707/722 |
| 2016/0364434 | A1* | 12/2016 | Spitz | G06F 16/215 |
| 2017/0154087 | A1* | 6/2017 | McClure | G06F 16/26 |
| 2018/0052878 | A1* | 2/2018 | Seetharaman | G06F 3/0482 |
| 2018/0089291 | A1* | 3/2018 | Vankamamidi | G06Q 10/0637 |
| 2018/0157702 | A1* | 6/2018 | Clemens | G06F 16/83 |
| 2018/0240273 | A1* | 8/2018 | Gordon | G06F 16/215 |

* cited by examiner

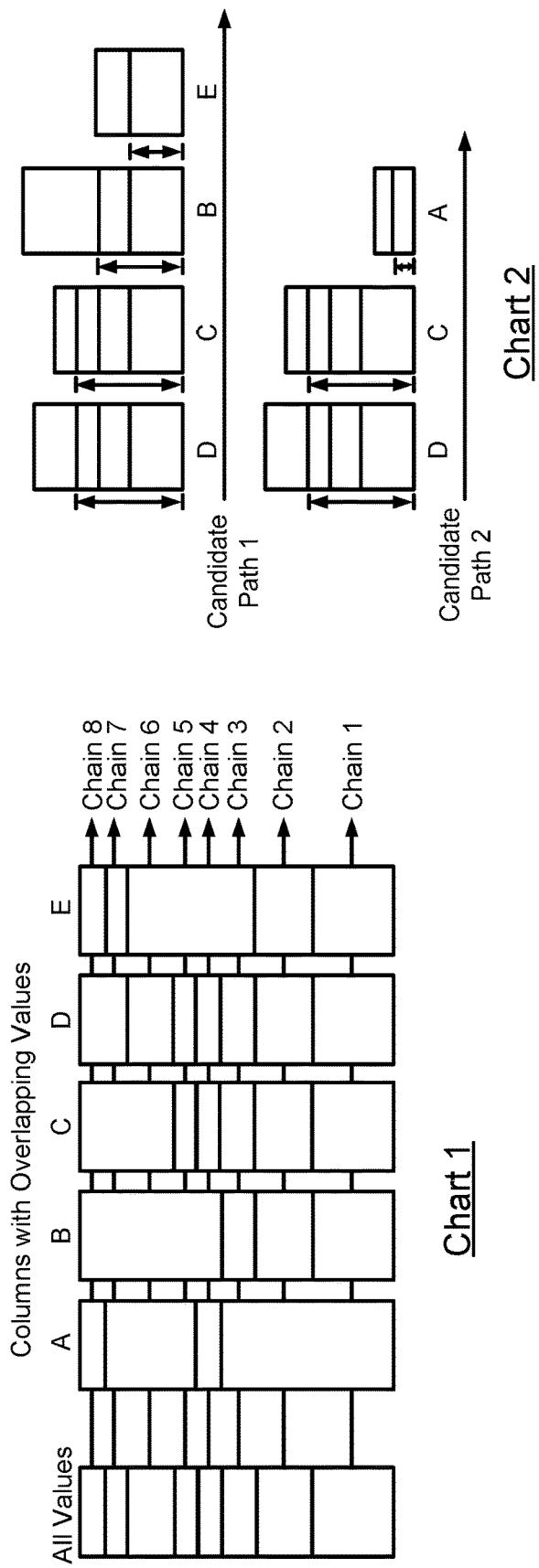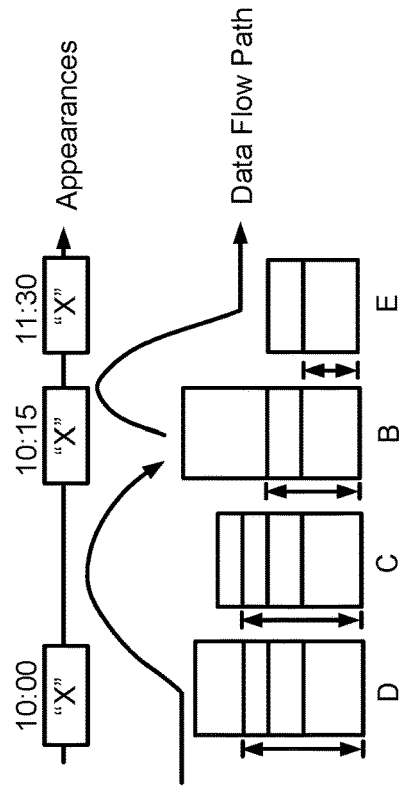
Figure 7

DATA LINEAGE ANALYSIS

CROSS-REFERENCE TO RELATED APPLICATIONS

This application claims priority from U.S. Provisional Application No. 62/356,928, filed on Jun. 30, 2016. This application is also related to a co-pending application titled "DATA LINKING" filed on even date herewith.

TECHNICAL FIELD

The present disclosure relates to data management. More particularly, the present disclosure relates to data lineage analysis.

BACKGROUND

The amount of data generated has been growing exponentially. As computer technologies are increasingly adopted and improved in various fields, there will be vast amounts of data generated by various systems. Generated data also moves between several systems and can go through various processes. Such movement of data can lead to loss of data integrity and validity. Data lineage techniques aim at addressing this problem by tracing flow of data across various systems. By tracing data flow, validity and integrity of data can be ensured, outdated copies of data can be identified and decommissioned, complex data flows can be reengineered to improve data quality, and regulatory compliance audits can be facilitated.

Currently available data lineage techniques can be considered primitive as they only produce a visual representation of data flow. There is no way to easily trace data flows from one system to another.

SUMMARY

According to an example of the present disclosure, a computer-implemented method of tracing data flow is disclosed. The method includes profiling and classifying, by at least one processing device, domains based on features of columns containing data. Further, the method includes selecting a lineage analysis method. The lineage analysis method includes selecting a timestamp-based lineage method, when database tables for the domains include audit columns. The lineage analysis method includes selecting a stroboscopic-sampling based lineage method, when a semantic object or column(s) mapped to a single domain are present. Additionally, the stroboscopic-sampling based lineage method may be selected, when the database tables for the domains do not include the audit columns. The lineage analysis method also includes selecting a record-based lineage method, when a lineage between a source schema and a target schema is to be ascertained. The method further includes executing the selected lineage method, and presenting lineage results.

According to another example embodiment of the present disclosure, a computer system for tracing data flow is disclosed. The computer system includes a domain profiler, a lineage analyzer, and a display unit. The domain profiler is implemented by at least one processing device, and is operable to profile and classify domains based on features of columns containing data. The lineage analyzer is operable to generate lineage result based on the domains. The lineage analyzer further includes a timestamp-based lineage generator, a stroboscopic-sampling based lineage generator, and a record-based lineage generator. The timestamp-based lineage generator is operable to generate the lineage results when database tables for the domains include audit columns. The stroboscopic-sampling based lineage generator is operable to generate the lineage results when a semantic object and/or a column mapped to a single domain is present. In another example, a stroboscopic-sampling based lineage generator is operable when the database tables for the domains do not include audit columns. In yet another example, a stroboscopic-sampling based generator may be operable when some database tables for the domains have audit columns and others do not. The record-based lineage generator is operable to generate the lineage results when a lineage between a source schema and a target schema is to be ascertained. Further, the display unit is operable to display the lineage results.

According to yet another example embodiment of the present disclosure, a non-transitory computer-readable medium is disclosed. The non-transitory computer-readable medium includes instructions that, when executed by a processor, cause the processor to perform a method of tracing data flow. The method includes profiling and classifying, by at least one processing device, domains based on features of columns containing data. Further, the method includes selecting a lineage analysis method. The lineage analysis method includes selecting a timestamp-based lineage method, when database tables for the domains include audit columns. The lineage analysis method includes selecting a stroboscopic-sampling based lineage method, when a semantic object and/or columns mapped to a single domain are present. The lineage analysis method includes selecting a record-based lineage method, when a lineage between a source schema and a target schema is to be ascertained. The method further includes executing the selected lineage method and presenting lineage results.

BRIEF DESCRIPTION OF THE DRAWINGS

Embodiments and examples are described in detail in the following description with reference to the following figures. The embodiments are illustrated by examples shown in the accompanying figures in which like reference numerals indicate similar elements.

FIG. 7 illustrates an example of tracing of the data flow by using the stroboscopic-sampling based lineage method, according to an example embodiment of the present disclosure;

DETAILED DESCRIPTION

Figure 1:
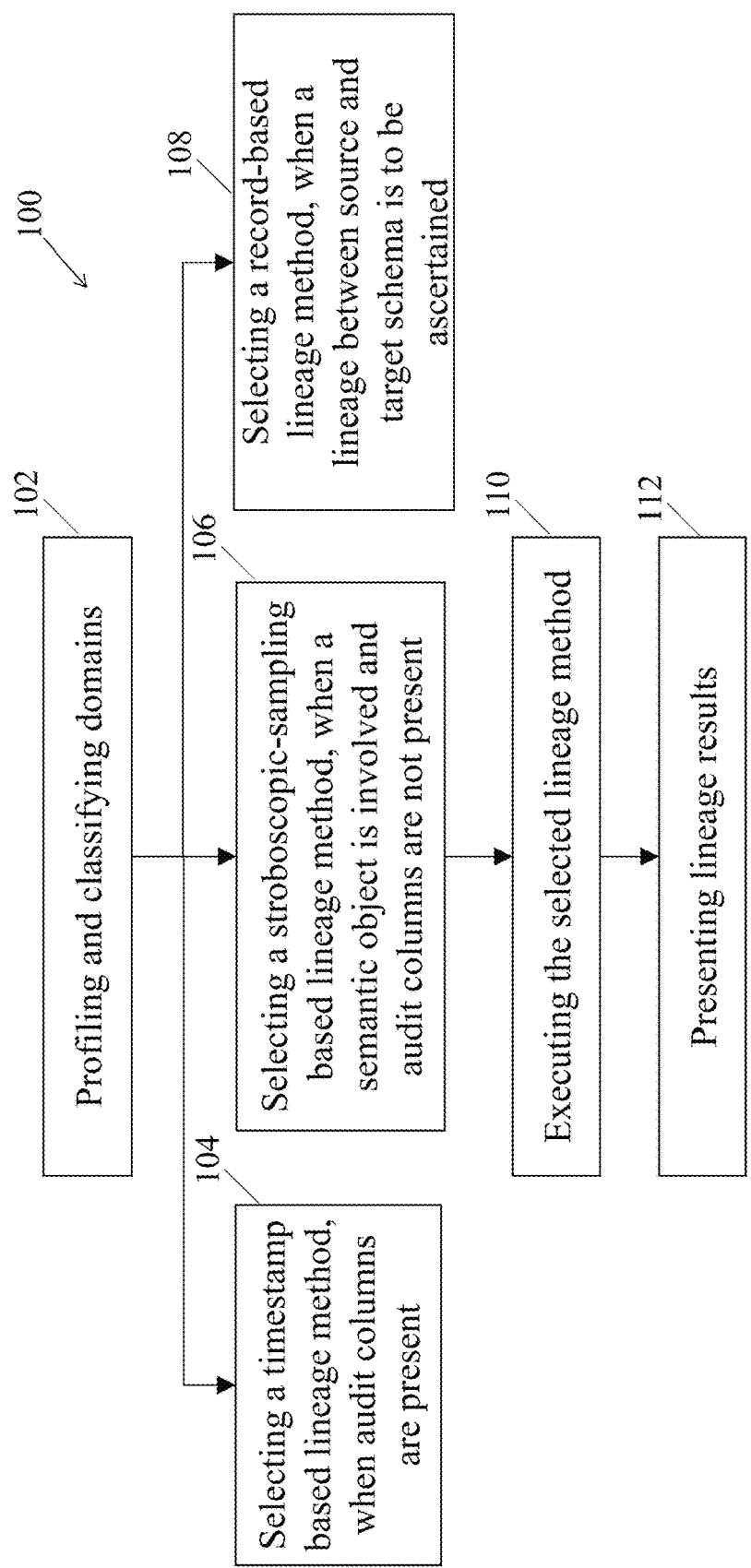
FIG. 1 illustrates a flow chart depicting a computer-implemented method of tracing data flow, according to an example embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description. Furthermore, the embodiments and examples may be used together in various combinations.

The present disclosure relates to a computer-implemented method and a computer system for tracing data flow, according to an example embodiment of the present disclosure. The method commences with profiling and classifying domains based on features of columns containing data. In an example embodiment, at least one processing device of the computer system may be configured to profile and classify the domains. Based on the profiling and classification, a lineage analysis method may be selected for tracing the data flow. In one example embodiment, one of a timestamp-based lineage method, a stroboscopic-sampling based lineage method, and a record-based lineage method may be selected for tracing the data flow.

In one example embodiment, when database tables for the domains include audit columns, the timestamp-based lineage method may be selected for tracing the data flow. In another example embodiment, when a semantic object or columns mapped to a domain are present, the stroboscopic-sampling based lineage method may be selected for tracing the data. Additionally, the stroboscopic-sampling based lineage method may be selected, when the database tables for the domains do not include the audit columns or if some database tables include audit columns while others do not. In yet another example embodiment, when a lineage between a source schema and a target schema is to be ascertained, the record-based lineage method may be selected for tracing the data. In continuation to the selection of the lineage analysis method, the method includes executing the selected lineage analysis method.

In the timestamp-based lineage method, tables containing timestamps may be identified for a particular domain. Further, based on the timestamps, an order of the identified tables may be determined. The timestamp-based lineage method utilizes timestamps associated with activities for tracing the data pertaining to the activities.

In the stroboscopic-sampling based lineage method, samples of data corresponding to the domains may be collected based on a sampling frequency. Therefore, after each predefined time interval, a sample of data corresponding to the domains may be collected. Further, presence of each data value may be detected across the collected samples. Based on the appearance of the data values across the samples, sequences of data flow across and within systems may accordingly be determined.

In the record-based lineage method, domains that are present both in the source schema and the target schema are identified. Subsequently, columns in the identified domains may be queried in order to determine whether there are intersecting values between the columns. When it is determined that there are intersecting values between the columns, the record-based lineage method includes assigning a lineage flow.

Based on the execution of any of the above-mentioned lineage analysis method, corresponding lineage results may be accordingly presented.

As would be gathered, the timestamp-based lineage method and the stroboscopic-sampling based lineage method may use statistical profiling to trace the data. On the other hand, the record-based lineage method may trace the data by analysing domain-value relationship between sets of tables of the data. Further, the timestamp-based lineage method, the stroboscopic-sampling based lineage method, and the record-based lineage method may depend on domain classification for tracing the data. The above-mentioned lineage analysis methods may classify the domain by defining a set of columns to be analyzed for potential relationships among them.

For example, in case of financial services, data flows across a front office information system, a middle office information system, and a back office information system. Usually trades are processed and corresponding information is recorded across a series of databases. Such records usually include one or more data elements for identifying transactions and parties involved in the transactions. The data elements may be utilized by the method and the computer system for tracing the flow of data. In one example, the data may found to be flowing from the front office information system to the back office information system through the middle office information system.

The present disclosure offers three different techniques for tracing the data flow. For different statistical situations and requirements, the present disclosure offers a different technique ensuring that a comprehensive framework is available for tracing the data flow. The vast majority of Extract Transform Load (ETL) flows involve mapping columns, one-for-one, between source and target databases. The most common transformation involves changing column names. Such flows can be detected by using the timestamp-based lineage method and the stroboscopic-sampling based lineage method. On the other hand, detailed pair-wise column mappings may be discovered by using the record-based lineage method. Therefore, the three techniques offer a wide variety of application for tracing the data flow.

In particular, the timestamp-based lineage method may be a useful starting point for evaluating data flows within and across bi-temporal databases and uni-temporal databases. This may discover flow sequences by using a single set of queries across each of the columns mapped to a domain. Further, the stroboscopic-sampling based lineage method may query the columns mapped to the domain over the series of intervals. In addition to tracing the data flow, the stroboscopic-sampling based lineage method may also estimate a rate of flow and latency. Further, the stroboscopic-sampling based lineage method may trace flows across database where the data are normalized differently. For example, a database schema may represent a contact record for a person and the contact record may include fields for a home phone number and a work phone number of the person. In another example, the database schema may include two separate fields in a single table. In yet another example, the contact record may be represented as a table of phone-numbers with a separate field for type of phone numbers.

This can be more complex in case of more tables in the database schema. For example, a schema may use a two-way join to link a set of three tables together, such as a semantic may be created to represent a billing arrangement. The semantic may then be used to trace the flow of a combination of data elements. For example, a table may be created which may include a billing account number, linked to a second table including service subscription history, and a third table including product detail records. Now, in order to trace the flow of a pair of elements, the billing-account-number and a product-code, the stroboscopic-sampling based lineage method may use information computed during domain analysis for identification places where combinations of these two fields exist. Further, different queries may be created for extracting pairs of data value samples from linked data elements, which may then be used to discover flow of like combinations of elements across databases. Therefore, the stroboscopic-sampling based lineage method is a useful technique that, when combined with data redundancy analysis, can locate unused or potentially stale data sources.

Further, the classification and profiling of the domains before executing the lineage analysis techniques results in a focused approach of tracing the data flow. Since the relevant domains and corresponding columns are organized for effectively tracing the data flow, the inconvenience of handling a large amount of unorganized data is mitigated. Moreover, the computer system and the method leave minimal scope of manual intervention leading to a reduction in possibilities of error and in turn to accurate and consistent outcome of the analysis. Therefore, the present disclosure offers a comprehensive computer system and the method of tracing the data flow in a systematic, automated, and effective manner.

FIG. 1 illustrates a flow chart depicting a computer-implemented method 100 of tracing data flow, according to one example embodiment of the present disclosure. At block 102, the method 100 may commence with profiling and classifying domains based on features of columns containing data. The profiling and classification of the domains may be performed to determine the data to be traced. In one example embodiment, profiling of domain may include identifying columns having similar data and accordingly grouping such columns. In continuation to the profiling and classification of the domains, a lineage analysis method for tracing the data may be selected. In one example embodiment, the method 100 may include selecting one of a timestamp-based lineage method, a stroboscopic-sampling based lineage method, and a record-based lineage method for tracing the data.

At block 104, the method 100 may include selecting the timestamp-based lineage method for tracing the data. In one example embodiment, the timestamp-based lineage method may be selected, when database tables for the domains may include audit columns. Generally, information systems use timestamps as record-level metadata to track database insert and update activity. Each activity associated with any movement of data may be associated with a timestamp, which would be indicative of a time of occurrence of the activity. Based on such timestamps, the timestamp-based lineage method may identify temporal relationships along data flow paths.

In one example embodiment, specific data elements, such as primary keys may be utilized in the lineage analysis method for determining the occurrence of any activity. Such primary keys may act as object identifiers, and may be a part of records that propagate downstream in a system. The primary keys may be used to identify business objects, such as trades, orders, and parties involved. For example, in case of the records being captured by a front office web order entry, unique identification values may be generated upon issuance of new orders. The unique identification values may be initially recorded in a local database. Further, the unique identification values may be recorded in downstream databases. In the timestamp-based lineage analysis, a sequence of flow may be determined by inspecting the audit columns associated with the unique identification values, as the corresponding data flow from one system to another.

At block 106, the method 100 may include selecting the stroboscopic-sampling based lineage method for tracing the data. In one example embodiment, the stroboscopic-sampling based lineage method may be selected, when a semantic object may be present and the database tables for the domains may not include the audit columns. A semantic object may be understood as a template or a specification of a class of data objects having specific attributes defined by domains. In another example embodiment, the stroboscopic-sampling based lineage method may be selected in case of presence of individual data elements as well. In a another example embodiment, the stroboscopic-sampling based lineage method may be selected when the database tables for the domains may include the audit columns. In such an example embodiment, some of the database tables may include the audit columns and the rest of the database tables may not include the audit columns. In yet another example embodiment, the stroboscopic-sampling based lineage method may be selected when columns may be mapped to a single domain.

In one example embodiment, in the stroboscopic-sampling based lineage method, a series of differential samples of data may be collected at specific time intervals for tracing the data flow, based on a sampling frequency. Further, pairs of consistent samples collected over one or more time intervals from columns mapped to a given domain or combinations of several domains may be compared with each. In one example embodiment, the timestamps associated with each time interval may then be used to sequence the columns along flow paths. For example, systems corresponding to data entry may have the earliest timestamps. Similarly, populating of downstream columns may have more recent timestamps.

Moreover, in one example embodiment, the stroboscopic-sampling based lineage method may also provide means to estimate a rate and latency at which the data flows from one database to another. Data flow paths which are the results of either automated or manual processes may exhibit similar movement of the primary keys from one database to another database. However, variability in latencies measured within manual flow paths may be more with respect to variability in latencies measure within automatic flow paths. In case of an order processing flow that involves a manual provisioning step, order records may originate in web or other front office systems before being sent to a downstream provisioning system. In the present example, timing of records moving from an order entry phase to a provisioning phase may be fairly consistent. The records may be moved within seconds using real-time messaging, or may be moved on 15 minute intervals via a batch process. In either case, the records may exhibit regular variations in latencies. Any step along the way that may involve a human in the loop may have more variability.

At block 108, the method 100 may include selecting the record-based lineage method for tracing the data. In one example embodiment, the method 100 may select the record-based lineage method, when a lineage between a source schema and a target schema is to be ascertained.

At block 110, the method 100 may include executing the selected lineage analysis method, for example, the timestamp-based lineage method, the stroboscopic-sampling based lineage method, or the record-based lineage method as mentioned above. At block 112, the method 100 may include presenting lineage results in response to the execution of the selected lineage analysis method.

Figure 2:
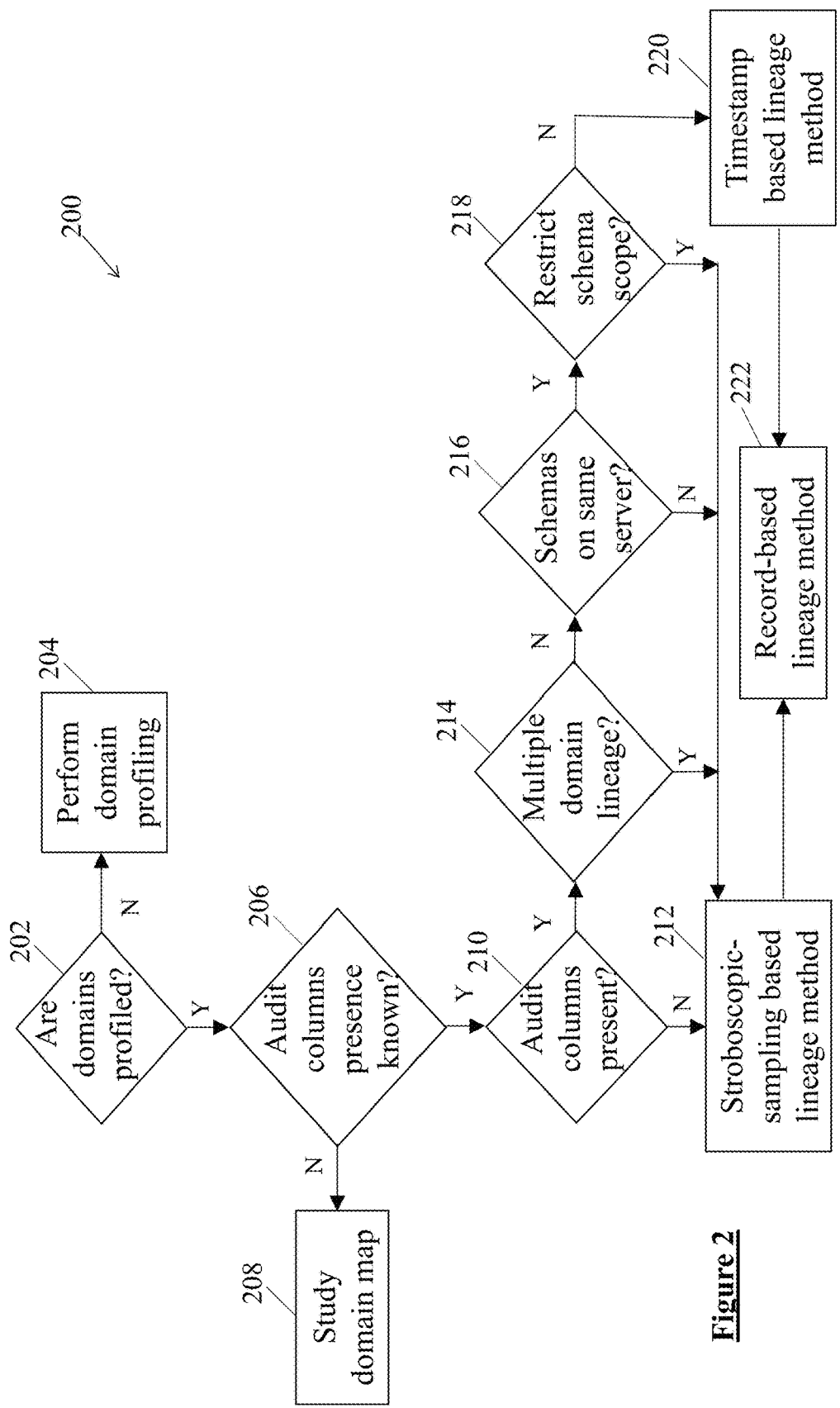
FIG. 2 illustrates a flow chart depicting a detailed computer-implemented method of tracing data flow, according to an example embodiment of the present disclosure.

FIG. 2 illustrates a flow chart depicting a detailed computer-implemented method 200 of tracing the data, according to one example embodiment of the present disclosure. At block 202, the method 200 may commence with determination of whether the domains have been profiled. In one example embodiment, when it is determined that the domains are not profiled, the method 200 branches to block 204. At the block 204, the domains are profiled for further processing. In an alternative example embodiment, when it is determined that the domains are profiled, the method 200 branches to block 206.

At the block 206, it is determined whether presence of the audit columns is known. In one example embodiment, when it is determined that the presence of the audit columns is not known, the method 200 branches to block 208. At the block 208, a domain map indicative of the audit columns may be studied and analyzed to know about the presence of the audit columns. In an alternative example embodiment, when it is determined that the presence of the audit columns is known, the method 200 branches to block 210. In one example embodiment, after the determination of presence of the audit columns, the method 200 may include determining a preference between an analysis speed or a risk of invalid timestamp errors. The stroboscopic-sampling based lineage method may require repeated samples, whereas the timestamp-based lineage method may not require the repeated samples. Therefore, the timestamp-based lineage method may generate one result sooner than the stroboscopic-sampling based lineage method. On the other hand, the stroboscopic-sampling based lineage method may offer better accuracy at the expense of slower analysis speed.

At the block 210, it is determined whether the audit columns are present. In one example embodiment, when it is determined that the audit columns are not present, the method 200 branches to block 212. At the block 212, the stroboscopic-sampling based lineage method is selected for tracing the data. Further, after selection of the stroboscopic-sampling based lineage method, the method 200 branches to block 222. At the block 222, the record-based lineage method may be selected for determining additional mappings. In an alternative example embodiment, when it is determined that the audit columns are present, the method 200 branches to block 214.

At the block 214, it is determined whether the data lineage is on multiple domains. In one example embodiment, when it is determined that the data lineage is on multiple domains, the method 200 branches to the block 212. Therefore, in case of the data lineage to be determined on multiple domains, the stroboscopic-sampling based lineage method is selected for tracing the data. In an alternative example embodiment, when it is determined that the data lineage is not on multiple domains, the method 200 branches to block 216.

At the block 216, it is determined whether all schemas are on the same server. In one example embodiment, when it is determined that all the schemas are not present on the same server, the method 200 branches to the block 212. Therefore, in case the schemas are not on the same server, the stroboscopic-sampling based lineage method is selected for tracing the data. In an alternative example embodiment, when it is determined that the schemas are present on the same server, the method 200 branches to block 218.

At the block 218, it is determined whether scope of application or the schema is to be restricted. In one example embodiment, when it is determined that the scope is to be restricted, the method 200 branches to the block 212. In an alternative example embodiment, when it is determined that the scope is not to be restricted, the method 200 branches to the block 220. At the block 220, the timestamp-based lineage method is selected for tracing the data. In one example embodiment, after the selection of the timestamp-based lineage method, the method 200 branches to the block 222.

Figure 3:
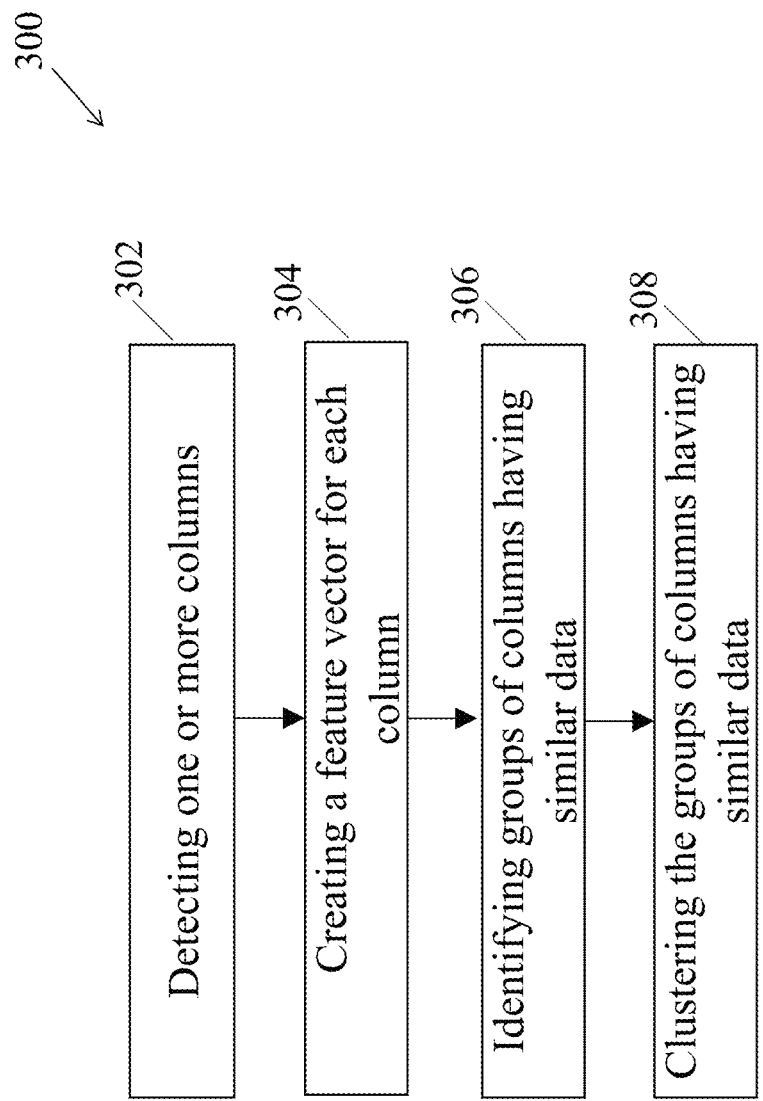
FIG. 3 illustrates a flow chart depicting profiling of domains, according to an example embodiment of the present disclosure.

FIG. 3 illustrates a flow chart depicting a method 300 for profiling of the domains, according to one example embodiment of the present disclosure. In one example embodiment, before executing any of the lineage analysis methods, the domains are profiled and categorized, based on features of the columns containing the data. The profiling and classification of the domains may be performed to determine the data to be traced.

At block 302, the method 300 includes detecting one or more columns. In one example embodiment, databases may be connected by querying schemas present in each of the databases. Further, the tables available in each of the schemas may be detected. Subsequently, columns representing domains available in each of the tables determined in the previous step may be detected. Further, each column may be queried to determine the data populated in the column.

At block 304, a feature vector is created for each of the columns detected at the block 302. In one example embodiment, the feature vector of the column may include, but is not limited to, statistical information indicating characteristics of data populated in the column. The statistical information may include, but is not limited to, distributions of data patterns, value lengths, proximate domains, and a series of consistent samples.

At block 306, the method 300 may include identifying groups of columns having similar data. At block 308, the groups of columns having similar data may be clustered together and classified into similar categories for further analysis, by using clustering techniques.

Figure 4:
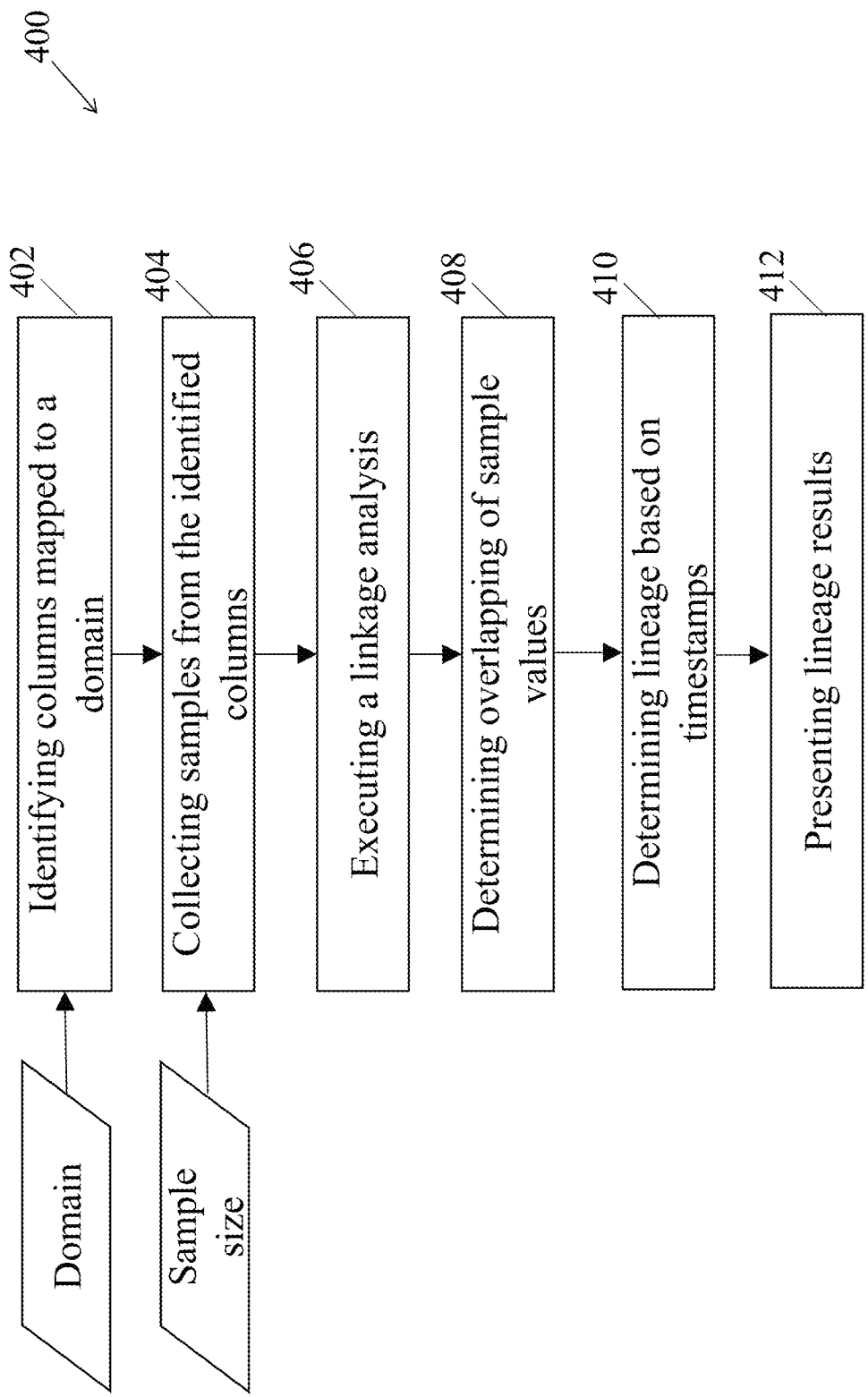
FIG. 4 illustrates a flow chart depicting a timestamp-based lineage method, according to an example embodiment of the present disclosure.

FIG. 4 illustrates a flow chart depicting the timestamp-based lineage method 400, interchangeably referred to as method 400, according to one example embodiment of the present disclosure. The method 400 may be used in cases where the audit columns are present in associated tables. At block 402, the method 400 commences with identifying tables or columns mapped to a selected domain. Each of the tables contains a corresponding timestamp. In one example embodiment, a timestamp may include a create time or an update time. As the name suggests, the create time is indicative of creation of an activity, for example, a data entry. Similarly, the update time is indicative of updating of the activity.

At block 404, the method 400 includes collecting samples from the columns identified at the block 402. In one example embodiment, a sample size may be defined before the collection of the samples. In such an example embodiment, the samples may be collected based on the predefined sample size. At block 406, the method 400 includes executing a linkage analysis. The execution of the linkage analysis may include using a small number of samples from each column mapped to a domain to detect common values for identifying existence of potential lineage flows. In one example embodiment, the linkage analysis may be executed in case of the stroboscopic-sampling based lineage method. In case of the timestamp-based lineage method, the linkage analysis may include using the timestamps to extract a predefined numbers of recent values populated in the columns being analyzed. Following the execution of the linkage, the method 400 branches to block 408.

At the block 408, the method 400 includes determining overlapping of sample values present in the collected samples. Therefore, the values which are common in multiple samples may be determined. Further, at block 410, a lineage may be determined based on corresponding timestamps associated with the sample values and overlapping of the sample values. In particular, the method 400 may include determining order of the identified tables based on the timestamps. The order would be indicative of the flow of the data in the tables. In one example embodiment, the determination of the order may include arranging the identified tables from an earliest timestamp to a latest timestamp. Therefore, the order would reflect the occurrence of activities, for example, addition, deletion, and moving, with regard to the data in a chronological manner.

At block 412, the method 400 includes presenting the lineage results based on the determination of the lineage. In one example embodiment, the lineage results include an ordered list of the identified tables.

Figure 5:
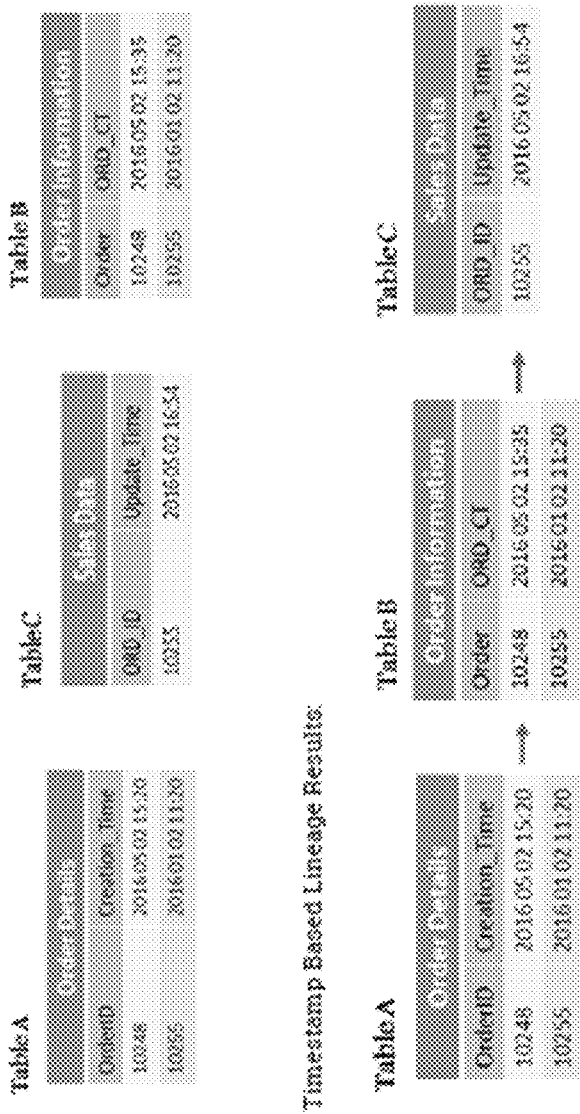
FIG. 5 illustrates an example of tracing of the data flow by using the timestamp-based lineage method, according to an example embodiment of the present disclosure.

FIG. 5 illustrates an example of tracing of the data flow by using the timestamp-based lineage method 400, according to one example embodiment of the present disclosure. It should be appreciated by a person skilled in the art that the example is illustrated in order to provide a better understanding and clarity of execution of the method 400 and therefore, should not be construed as limiting in any manner. In one example embodiment, the flow of data for a domain may be determined, based on the audit columns of the tables where the domain is located. A flow path of the data may be determined by comparing values of the audit columns for same values of the domain across the tables.

When the method 400 is executed for tracing the data in the domain, the tables containing the domain may be analyzed. The method 400 may arrange the tables based on the timestamps, for example, the create date and the update date, of the data in the column. In one example, two tables contain the domain on which the lineage is being found and the tables also contain the audit columns. In such an example, the method 400 may determine the lineage based on an assumption that data must have been transmitted from the table having a timestamp indicating an earlier time as compared to the table having timestamp of a later time.

For example, consider a domain titled "order ID" for determining the lineage. In the illustrated example, the domain "order ID" is found in three tables, namely table A, Table C, and Table B, as shown in the FIG. 5.

After identification of the tables containing the domain "order ID", the method 400 may analyze the table A, the table C, and the table B, and may arrange the tables in a sequence, based on the timestamps mentioned in the tables. As shown, based on the timestamps, the order of the tables or the flow of the data is found to be from the table A to the table C through the table B.

Figure 6:
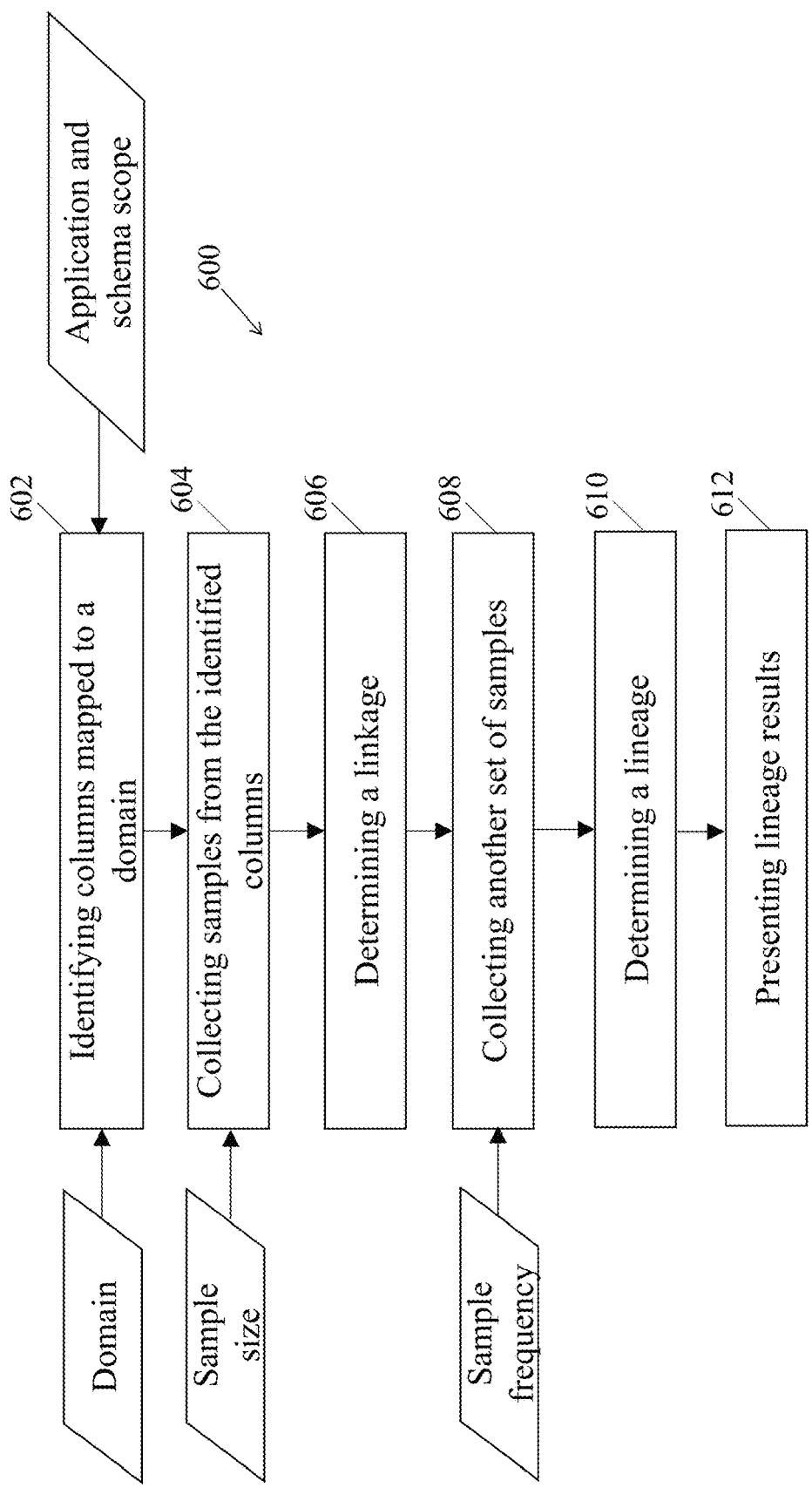
FIG. 6 illustrates a flow chart depicting a stroboscopic-sampling based lineage method, according to one example embodiment of the present disclosure.

FIG. 6 illustrates a flow chart depicting the stroboscopic-sampling based lineage method 600, interchangeably referred to as method 600, according to one example embodiment of the present disclosure. The method 600 commences at block 602 with identification of columns mapped to a domain. In one example embodiment, the method 600 may include selection of the domain against which the mapped columns have to be identified. Further, an application and a schema scope may also be determined before the identification. Therefore, the columns mapped to the domain may be identified, based on the application and the schema scope.

At block 604, the method 600 includes collecting samples of data from the identified columns of the domains at the same time. In an example embodiment, the samples of data may be selected, based on a sampling size defined before the collection. The method 600 may also include selecting the samples of data, based on a modulo parameter. In such an example embodiment, an MD5 hash for each distinct value found in a column of data may be computed. The MD5 hash is the basis for pulling random samples in a consistent manner. A number of samples so produced may then be controlled by the modulo parameter. Each hash value may be converted to an integer and divided by a modulo value. In one example embodiment, when a remainder such division is equal to zero, the sample is selected. In an alternative example embodiment, when the remainder is not equal to zero, the sample is rejected. In one example, modulating the sampling frequency by using a value of modulo 10 may produce approximately 1 sample for every 10 hash values. This technique may ensure any two columns containing exactly the same values may produce exactly the same set of randomly selected values.

Further, the method 600 may further include applying a tokenization parameter to one or more data types prior to collecting the samples of data at the block 604.

In an example, at block 606, a linkage is determined based on overlapping of the samples of the data collected at the block 604. In an example embodiment, when the overlapping does not exist, it is determined that a probability of existence of lineage between the samples of data is less. In an alternative example embodiment, when the overlapping does exist, it is determined that there is a reasonable possibility of existence of lineage between the tables having the samples of data. The determination at the block 606 may be considered as intermediate results of determining the linkage.

In another example, a linkage analysis may be performed to make an initial assessment of where data flows may exist. Subsequently, based on use case, lineage analysis may be performed.

In an example embodiment, a sampling frequency may be selected. The sampling frequency may be greater than two times the frequency of actual data movement. In other words, the method 600 includes determining sequences of data flow across and within systems based on appearance of data values across the samples. In an example embodiment, sequences of data flow for active columns where the samples yield differential values, may be determined. On the other hand, for dormant columns, the method 600 includes grouping columns with overlapping values into clusters. In one example, a sequence of columns within a cluster based on the number of common data values may be determined. Further, the sequence of columns represents linked columns.

Subsequently, in one example embodiment, at block 608, the method 600 includes collecting another set of samples from the identified columns, based on the sampling frequency. In one example, based on the sampling frequency, the method 600 includes repeatedly collecting sets of samples from the identified columns.

At block 610, the method 600 includes determining the lineage, based on the sets of the samples collected over the sampling frequency. In an example embodiment, the lineage may be determined in a sequence starting from a column where a sample appears first to a column where the sample appears subsequently and so on. In one example, when the samples are found to be not changing after a predefined number of samples, the method 600 may determine a direction of flow from larger tables to smaller tables. At block 612, the method 600 includes presenting lineage results. In an example embodiment, the lineage results may include the sequences of the data flow.

In one example embodiment, the domain on which the lineage is to be determined, the application scope, the schema scope, the sample size, the sampling interval, and the repetitions, i.e., a number of times the sampling is done on the dataset, may collectively be referred to as user-defined parameters.

In one example embodiment, for objects, the method 600 may require additional inputs of a semantic object. In such an embodiment, a primary domain and a secondary domain may be selected from the domains mapped to the object. In the present example embodiment, the method 600 may include identifying columns mapped to the primary domain based on the application scope and the schema scope. Further, the method 600 may include identifying columns mapped to the secondary domain in tables near each of the columns of the primary domain. Further, the method 600 may include concatenating combinations of records for each record in the columns of the primary domain to records in the columns of the secondary domain.

In an example embodiment, a sample of data may be collected, based on the sampling size from the identified columns at the same time. The method 600 proceeds with determining other occurrences of the abovementioned combination of values across the application scope and the scheme scope. In an example embodiment, when the occurrences are not determined, it may be ascertained that a probability of existence of the lineage may be less. In an alternative example embodiment, when the occurrences are determined, it is ascertained that a probability of existence of lineage exists.

Further, the method 600 may determine a possibility of lineage in case of single sampling. In an example embodiment, the method 600 may proceed with repeatedly collecting samples at a sampling frequency. The method 600 may collect multiple samples across a predefined duration of time in order to consolidate observations about the lineage and the flow of direction.

In an example embodiment, the method 600 may be selected for tracing the data based on an occurrence of a variety of circumstances. Such variety of circumstances may include, but are not limited to, when the lineage has to be determined for a semantic object, for example, a combination of multiple domains, when the application and schema scope may be restricted by the schema scope is greater than two schemas, when the audit columns may be missing from most of the tables to be analyzed, when the tables may be active and may not have the audit columns, when database connections may be distributed across multiple child servers, and in case of limited available servers or memory. In order to mitigate the concern of limited available servers or memory, as mentioned earlier, the method 600 may query the columns mapped to the domain at the same time and may then repeat the same based on the sampling frequency. Therefore, even in case of the unavailability of the servers for allocating memory to tasks, a number of queries may get queued up till the servers are made available. In an example embodiment, the present disclosure may run a a repeat series of analysis jobs on smaller subsets of columns that were potentially impacted by queuing during the first phase of lineage analysis.

As would be gathered, the method 600 automatically derives lineage flows by analysing data in motion. The method 600 uses differential sampling to identify the most recent changes to a column. The method 600 is called as the stroboscopic-sampling lineage method 600 because the method 600 works like a strobe light that flashes at predetermined time intervals. The method 600 can be used to trace the flow of individual data elements, for example, semantic domains, or combinations of data elements, for example, semantic objects.

In simpler words, the method 600 uses differential sampling, i.e. the method 600 collects a sample set of records from the tables in the scope at a particular instance of time. After a predefined period, the method 600 includes another sample set and considers the delta in the first sample set of data and the other sample set. The method 600 may keep collecting the sample set of records based on a predefined number of repetitions. The delta values assist in determining the lineage across the data landscape. In active tables or columns, the data in the databases is updated within the cycle of sampling. The method 600 is able to determine flow in such databases as well. On the other hand, relationships among samples collected from the dormant columns may be used to perform the linkage analysis.

The results of the lineage analysis as presented at block 612 may be indicative of relationships among columns having common values. The direction of flow may be determined using one of two methods. In an example embodiment, differential samples are used as a primary method. For example, column-to-column flow relationships may be computed by comparing latencies. Similarly, columns-with-common differential samples may be sequenced into lineage flow chains based on the time each sample first appeared within a column.

Further, comparisons between value sets may be used as a secondary technique for the analysis of the dormant tables. In an example embodiment, columns with common samples may be sequenced into flow chain sequences based on the series of samples found across a series of columns. Further, columns having the largest number of samples shared with other columns may be sequenced upstream from those having a smaller number of common samples.

FIG. 7 illustrates an example of tracing of the data flow by using the stroboscopic-sampling based lineage method 600, according to an example embodiment of the present disclosure. As would be gathered by now, stroboscopic profiling seeks to discover data flows by examining differences in column values over time. In an example embodiment, the columns to be analyzed may include columns that never change. For example, the columns may include reference tables, archive tables, or tables that are no longer being used. In an example embodiment, the columns that do not change during a period of analysis may be classified as "dormant" columns.

Initially, all the columns may be considered to be in a to-be-determined (TBD) state. In an example embodiment, columns may move from the TBD state to a DORMANT state after the first set of samples may be collected. The columns may remain DORMANT until a differential sample shows activity. On the other hand, columns that change are classified as "active" columns.

In an example embodiment, samples of the columns may be organized as the profiling progresses. Further, pairs of columns having overlapping samples may be grouped into clusters, and such clusters may then be internally sequenced into chains. Referring to chart 1 illustrated in FIG. 7, columns A, B, C, D, and E having values are shown. As shown, the column A has overlapping values with the column C and the column D, i.e., a chain 4. The column B, the column C, the column D, and the column E are also shown to share some of the same values, i.e., a chain 2.

In an example embodiment, relationships among sets of overlapping values within the clusters form linkage topologies. Stroboscopic lineage analysis may sequence these in two ways based on whether a column is dormant or active. In the chart 1, the column C and the column D participate in three chains, and have the largest number of common samples. One of the chains, i.e., the chain 2, spans four columns, namely, the column B, the column C, the column D, and the column E. A chain 3 spans three columns, namely the column B, the column C, and the column D. Further, the chain 4 spans three columns as well, namely the column A, the column C, and the column D.

Further, the columns may be sequenced from left to right beginning with the column pair having the largest number of common samples. This pair is sequenced by placing the column having the largest total number of samples furthest to the left. Further, the column B may be placed next. Of the remaining columns, it has the largest number of samples in common with the intersection of the column D and the column C. This process continues until no other columns are found with samples in common with the intersection of values in the last column pair. This is the column E in this example as the yellow block is included in the intersection of the column C and the column B.

Further, the remaining columns may be sequenced by working backwards. The column A may remain but may not have any common values within the intersection of the column B and the column E. Nor does it have any values in common within the intersection of the next pair to the left, the column C and the column B. But it does share the blue block with the next pair to the left, the column D and the column C. This forms a second candidate path, D->C->A. The second candidate path and the first candidate path are shown in a chart 2 of FIG. 7.

These candidate flow paths may represent linked columns, but not necessarily data movement. Some of these relationships may be foreign key relationships within a schema, some may be relationships among cloned or archived tables, and some may be phantom relationships.

In an example embodiment, the timestamp-based lineage method and the stroboscopic-sampling based lineage method may be susceptible to the problem of discovering phantom linage relationships. This happens when tracing data elements which represent attributes of objects rather than object identifier values. For example, a country code attribute associated with contact information for a person and a country code associated with country of origin for a transaction. These might coincidently be mapped to a common domain and, as such, lineage analysis will attempt to find a flow relationship.

This can be avoided for timestamp-based lineage by selecting domains which represent object identifiers such as order numbers or natural keys such as person name.

Stroboscopic lineage may find phantom lineage flows during static analysis. The set of attribute values such as country code will typically stabilize within tables that contain them. For that reason these columns will not generate differential samples and will appear to be dormant. This can be avoided by reducing the scope of analysis to exclude unrelated applications, or by tracing a combination of pairs of elements where one or both of the elements represents an attribute of an object. This reduces the probability of finding matching combinations outside of actual data flows.

While they will only coincidentally represent data flows, they do reveal places where data flows may exist. The actual flows are discovered via differential sampling. In differential sampling, data flows may be detected by comparing changes in column values over time. Chart 3 of FIG. 7 represents differential sampling. The value "X" may appear in a differential sample taken at 10:00 from the column D. The same value appears in the column B in a sample taken at 10:15 and the column E at 11:30. As can be seen, timing the appearances of differential samples reveals regular patterns. Active column analysis looks for regular movement patterns. If 90% of the time a sample detected in the column D appears in the column B within 15 minutes, then one can assume there is regular data flow between the two columns. Points where there are regular flows can then be connected into flow paths.

The current version of the software shows a composite view of linkage and lineage relationships. It shows the most current version of these relationships as computed through the latest lineage analysis project for a given domain or a semantic object. The next release will have the ability to hide the linkage relationships so that paths derived from differential samples can be seen in isolation.

Figure 8:
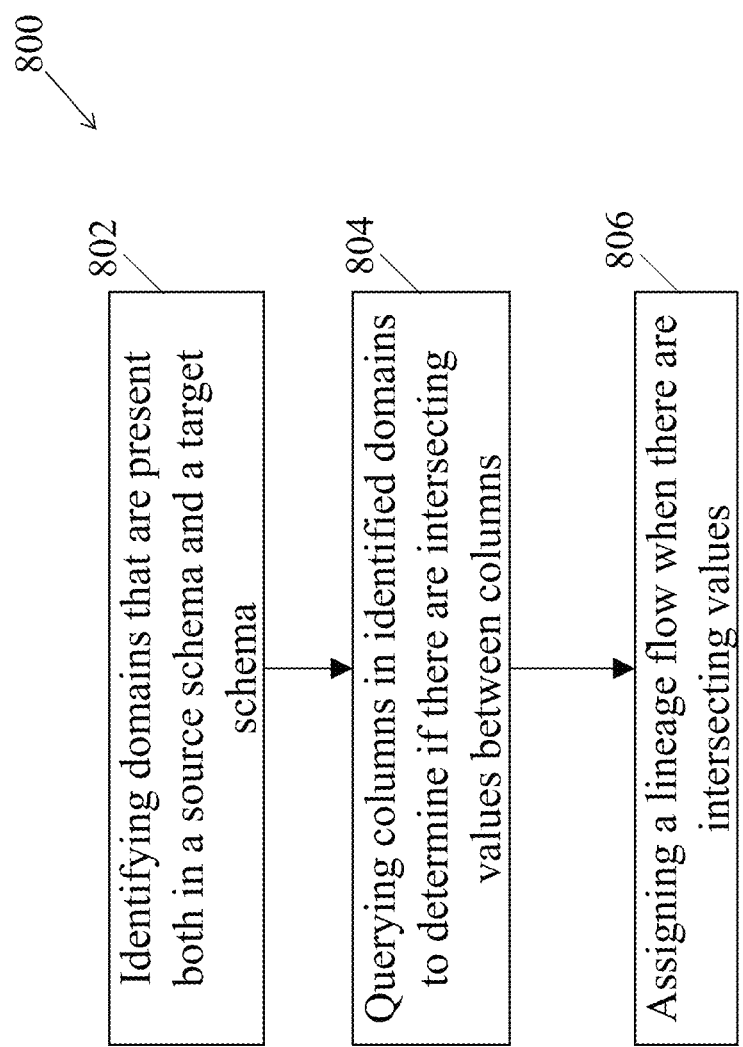
FIG. 8 illustrates a flow chart depicting a record-based lineage method, according to an example embodiment of the present disclosure.

FIG. 8 illustrates a flow chart depicting the record-based lineage method 800, interchangeably referred to as the method 800, according to an example embodiment of the present disclosure. In this method 800, the flow of data for a specific domain across the ecosystem may be determined on the basis of the common data values across records. Further, in order to implement the method 800, a source schema table and a target schema table may have to be predefined.

The method 800 may be used for tracing the data if the lineage has to be identified between two schemas. In another example embodiment, the method 800 may be used to derive the lineage between the other columns of tables in two schemas and to add a data lineage between a known source and a target schema to show up on the lineage view, after timestamp or stroboscopic lineage is found. In yet another example embodiment, the method 800 may be used in case of data integration in order to determine the line up of the columns against each other in a pair wise manner.

At block 802, the method 800 includes identifying domains that are present in the source schema as well as the target schema.

At block 804, columns in the identified domains may be queried to determine if there are intersecting values between the columns. Therefore, records from two tables may be compared to determine the intersecting values. In an example embodiment, a threshold may be applied for determining a number of intersecting values.

At block 806, the method 800 includes assigning a lineage flow when there are intersecting values.

Figure 9:
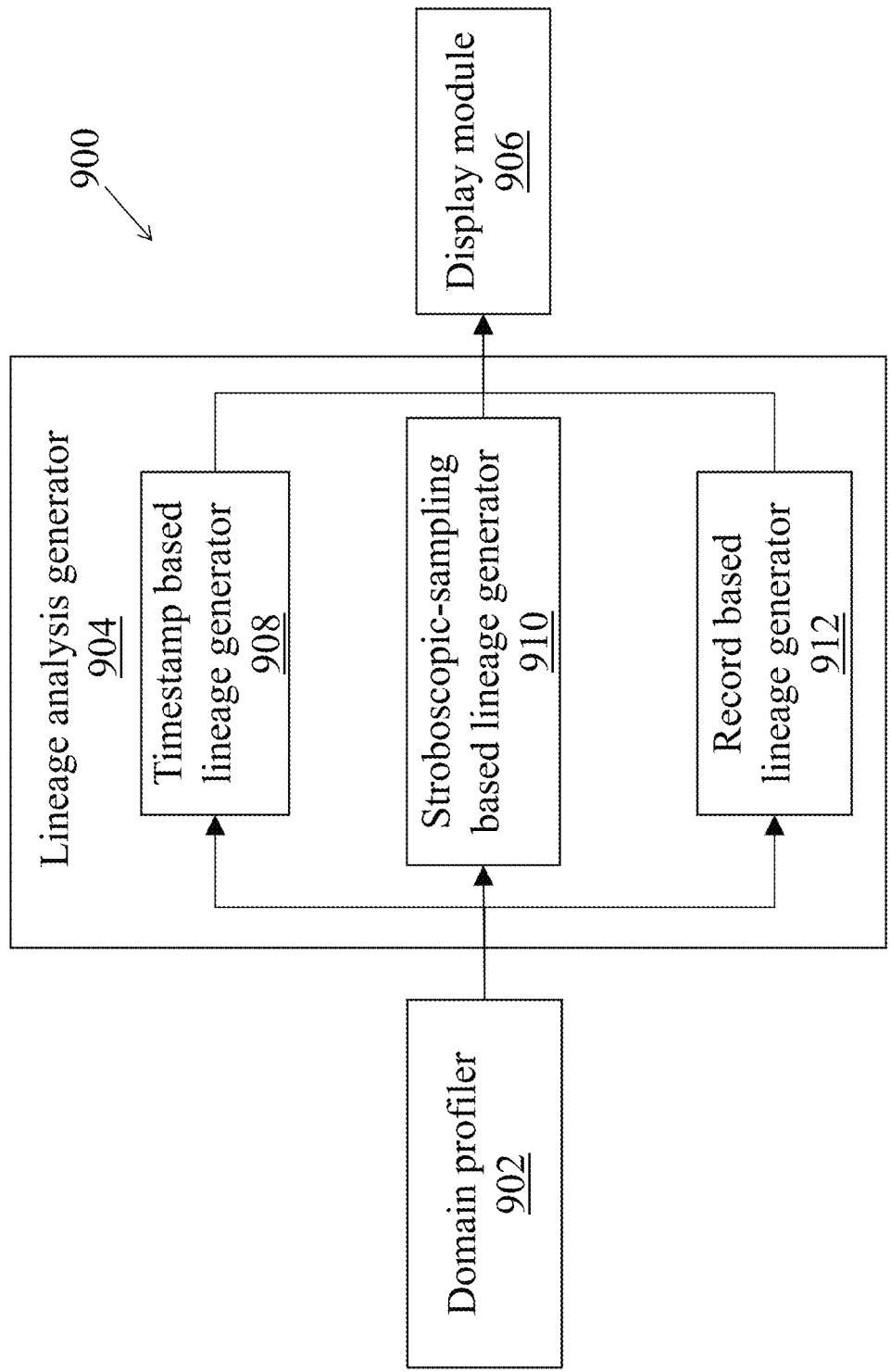
FIG. 9 illustrates a block diagram of a computer system for tracing data flow, according to an example embodiment of the present disclosure.

FIG. 9 illustrates a block diagram of a computer system 900 for tracing data flow, according to an example embodiment of the present disclosure. The computer system 900 is hereinafter interchangeably referred to as the method 900. For the sake of brevity, the constructional and operational features of the present disclosure which are explained in detail in the description of FIG. 1, FIG. 2, FIG. 3, FIG. 4, FIG. 5, FIG. 6, FIG. 7, and FIG. 8 are not explained in detail in the description of FIG. 9. In an example embodiment, the system 900 may include a domain profiler 902, a lineage analyzer 904 in communication with the domain profiler 902, and a display unit 906 in communication with the lineage analyzer 904.

Figure 10:
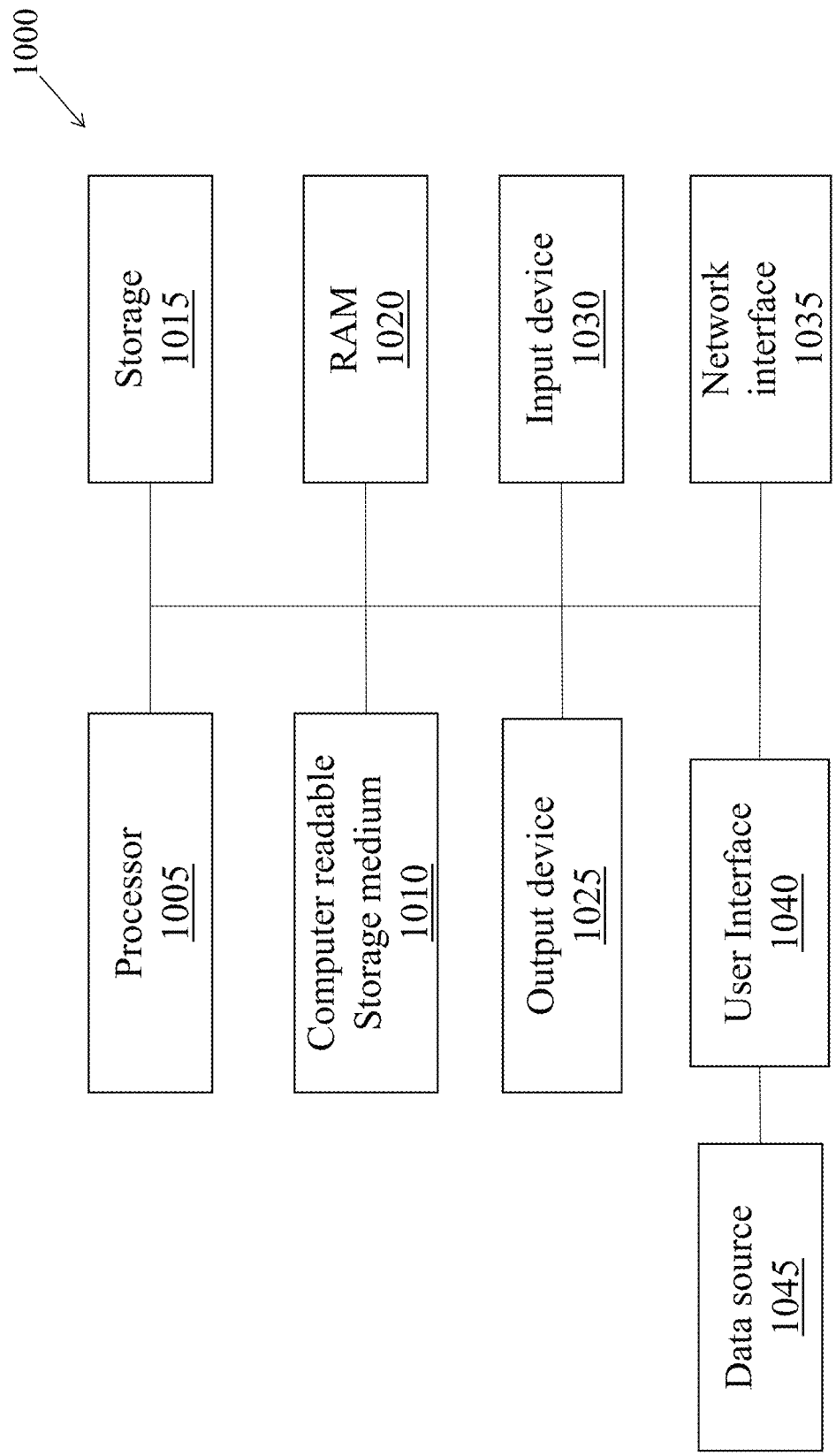
FIG. 10 illustrates a hardware platform for implementation of the computer system, according to an example embodiment of the present disclosure.

In an example embodiment, the domain profiler 902 may be implemented by at least one processing device (shown in FIG. 10). The domain profiler 902 may be operable to profile and classify the domains based on the features of the columns containing the data.

Further, the lineage analyzer 904 may be operable to generate lineage result based on the domains. The lineage analyzer 904 may include a timestamp-based lineage generator 908, a stroboscopic-sampling based lineage generator 910, and a record-based lineage generator 912 which may be in communication with each other. The timestamp-based lineage generator 908 may generate the lineage results when the database tables for the domains include the audit columns. The timestamp-based lineage generator 908 may identify the tables containing the timestamps for a particular domain. Based on the identification, the timestamp-based lineage generator 908 may determine the order of the identified tables based on the timestamps. In an example embodiment, the order of the identified tables may include an arrangement of the identified tables from an earliest timestamp to a latest timestamp. The lineage results may include an ordered list of the identified tables.

The stroboscopic-sampling based lineage generator 910 may generate the lineage results when a semantic object is present and the database tables for the domains do not include the audit columns. In an example embodiment, the stroboscopic-sampling based lineage generator 910 may collect samples of data corresponding to the domains based on the sampling frequency. In an example embodiment, the stroboscopic-sampling based lineage generator 910 may apply a tokenization parameter to one or more data types prior to collecting samples of data. Following the collection of the data, the stroboscopic-sampling based lineage generator 910 may determine sequences of data flow across and within systems based on appearance of data values across the samples. In an example embodiment, the lineage results may include the sequences of data flow. Further, in an example embodiment, determining the sequences of the data flow may include determining the sequences of data flow for active columns where the samples yield differential values.

For dormant columns, the stroboscopic-sampling based lineage generator 910 may group the columns with overlapping values into the clusters. Subsequently, a sequence of columns within a cluster may be determined, based on the number of common data values. The sequence of columns may be indicative of linked columns.

The record-based lineage generator 912 may generate the lineage results when a lineage between source and target schema is to be ascertained. In an example embodiment, the record-based lineage generator 912 may identify domains that are present both in the source schema and the target schema. The record-based lineage generator 912 may query columns in the identified domains to determine if there are intersecting values between the columns. In an example embodiment, the record-based lineage generator 912 may apply a threshold value for number of the intersecting values to be determined. Further, a lineage flow may be assigned, when the record-based lineage generator 912 determines that there are intersecting values.

In an example embodiment, the display unit 906 of the system 900 may display the lineage results. The lineage results may be displayed to a user through an output device (not shown).

FIG. 10 illustrates a hardware platform 1000 for implementation of the computer system 100, according to an example embodiment of the present disclosure. In an example embodiment, the hardware platform 1000 may be a computation system 1000 that may be used with the examples described herein. The computation system 1000 may represent a computational platform that includes components that may be in a server or another computer system. The computation system 1000 may execute, by a processor 1005 (e.g., a single or multiple processors) or other hardware processing circuit, the methods, functions and other processes described herein. These methods, functions and other processes may be embodied as machine readable instructions stored on a computer readable storage medium 1010, which may be non-transitory, such as hardware storage devices, for example, Random Access Memory (RAM), Read Only Memory (ROM), Erasable Programmable ROM (EPROM), Electrically Erasable Programmable ROM (EEPROM), hard drives, and flash memory.

The computation system 1000 may include the processor 1005 that may implement or execute machine readable instructions performing some or all of the methods, functions, techniques and/or other processes described herein. Commands and data from the processor 1005 may be communicated over a communication bus (not shown). The computation system 1000 may also include a main memory 1020, such as a random access memory (RAM), where the machine readable instructions and data for the processor 1005 may reside during runtime, and a storage 1015, which may be non-volatile and stores machine readable instructions and data. The memory 1020 and the storage 1015 are examples of non-transitory computer readable mediums. The memory 1020 and/or the secondary data storage may store data used by the computation system 1000, such as an object repository including web objects, configuration data, test data, etc.

The computation system 1000 may include an input device 1030, such as a keyboard and a mouse, and an output device 1025. A user interface 1040 can be a communication device that provides textual and graphical user interfaces to a user of the computation system 1000. The user interface 1040 may operate with the input device 1030 and the output device 1025 to accept from and provide data to a user, for example, from a data source 1045. The computation system 1000 may include a network interface 1035 for connecting to a network. Other known electronic components may be added or substituted in the computer system. The processor 1005 may be designated as a hardware processor. The processor 1005 may execute various components of the computation system 1000 described above and perform the methods described below.

In an example embodiment, a non-transitory computer-readable medium may include instructions that, when executed by the processor also referred to as the at least one processing unit, cause the processor to perform the method 100 of tracing the data flow. The method 100 may include profiling and classifying, by the at least one processing device, domains based on features of columns containing data. The method 100 may further include selecting the lineage analysis method. The lineage analysis method may include selecting the timestamp-based lineage method, when the database tables for the domains include the audit columns. The lineage analysis method may include selecting the stroboscopic-sampling based lineage method, when the semantic object is present and the database tables for the domains do not include the audit columns. Further, the lineage analysis method may include selecting the record-based lineage method, when a lineage between source and target schema is to be ascertained. The method 100 may further include executing the selected lineage method, and presenting the lineage results.

Example embodiments and examples are described above, and those skilled in the art will be able to make various modifications to the described example embodiments and examples without departing from the scope of the example embodiments and examples.

Although the processes illustrated and described herein include series of steps, it will be appreciated that the different example embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

What is claimed is:

1. A computer-implemented method of tracing data flow comprising:
    profiling and classifying, by at least one processing device, domains based on features of columns containing data;
    selecting a lineage analysis method, the selecting comprises:
        when database tables for the domains include audit columns, selecting a timestamp-based lineage method;
        when one of a semantic object and a column mapped to a single domain is present, selecting a stroboscopic-sampling based lineage method; and
        when a lineage between a source schema and a target schema is to be ascertained, selecting a record-based lineage method;
    executing the selected lineage analysis method; and
    presenting lineage results.

2. The method of claim 1, wherein the timestamp-based lineage method comprises:
    for a particular domain, identifying tables containing timestamps; and
    determining an order of the identified tables based on the timestamps, wherein the lineage results comprise an ordered list of the identified tables.

3. The method of claim 2, wherein the timestamps contain a create time or an update time.

4. The method of claim 2, wherein determining the order further comprises:
    arranging the identified tables from an earliest timestamp to a latest timestamp.

5. The method of claim 1, wherein the stroboscopic-sampling based lineage method is selected when the database tables for the domains do not include the audit columns, and wherein the stroboscopic-sampling based lineage method comprises:
    collecting samples of data corresponding to the domains based on a sampling frequency; and
    determining sequences of the data flow across and within systems based on appearance of data values across the samples, wherein the lineage results include the sequences of the data flow.

6. The method of claim 5, wherein determining the sequences of the data flow comprises:
    determining the sequences of the data flow for active columns where the samples yield differential values.

7. The method of claim 6, wherein the method further comprises:
    for dormant columns, grouping columns with overlapping values into clusters; and
    determining a sequence of columns within a cluster based on the number of common data values, wherein the sequence of columns represent linked columns.

8. The method of claim 5, wherein the sampling frequency is greater than two times the frequency of actual data movement.

9. The method of claim 5, further comprises:
    applying a tokenization parameter to one or more data types prior to collecting samples of data.

10. The method of claim 5, wherein the samples of the data are selected based on a modulo parameter.

11. The method of claim 1, wherein the record-based lineage method comprises:
    identifying domains that are present both in the source schema and the target schema;
    querying columns in the identified domains to determine if there are intersecting values between the columns; and
    assigning a lineage flow when there are intersecting values.

12. The method of claim 11, further comprising:
    applying a threshold for a number of the intersecting values to be determined.

13. A computer system for tracing data flow, comprises:
    a domain profiler, implemented by at least one processing device, to profile and classify domains based on features of columns containing data;
    a lineage analyser to generate lineage results based on the domains, the lineage analyser comprises:
        timestamp-based lineage generator to generate the lineage results when database tables for the domains include audit columns;
        a stroboscopic-sampling based lineage generator to generate the lineage results when one of a semantic object and columns mapped to a single domain is present and the database tables for the domains do not include the audit columns; and
        a record-based lineage generator to generate the lineage results when a lineage between a source schema and a target schema is to be determined; and
    a display unit to facilitate displaying of the lineage results.

14. The computer system of claim 13 wherein the timestamp-based lineage generator is:
    for a particular domain, identify tables containing timestamps; and
    determine an order of the identified tables based on the timestamps, wherein the lineage results comprise an ordered list of the identified tables.

15. The computer system of claim 14, wherein the timestamps contain a create time or an update time.

16. The computer system of claim 14, wherein the order of the identified tables comprises an arrangement of the identified tables from an earliest timestamp to a latest timestamp.

17. The computer system of claim 13, wherein the stroboscopic-sampling based lineage generator is to:
    collect samples of data corresponding to the domains based on a sampling frequency; and
    determine sequences of the data flow across and within systems based on appearance of data values across the samples, wherein the lineage results include the sequences of the data flow.

18. The computer system of claim 17, wherein determining the sequences of the data flow comprises:
determining the sequences of the data flow for active columns where the samples yield differential values.

19. The computer system of claim 17, wherein the stroboscopic-sampling based lineage generator is further to:
for dormant columns, group columns with overlapping values into clusters; and
determine a sequence of the columns within a cluster based on the number of common data values, wherein the sequence of the columns represent linked columns.

20. The computer system of claim 17, wherein the sampling frequency is greater than two times the frequency of actual data movement.

21. The computer system of claim 17, wherein the stroboscopic-sampling based lineage generator is to:
apply a tokenization parameter to one or more data types prior to collecting samples of data.

22. The computer system of claim 17, wherein the samples of the data are selected based on a modulo parameter.

23. The computer system of claim 13, wherein the record-based lineage generator is to:
identify domains that are present both in the source schema and the target schema;
query columns in the identified domains to determine if there are intersecting values between the columns; and
assign a lineage flow when there are intersecting values.

24. The computer system of claim 23, wherein the record-based lineage generator is further to:
apply a threshold for a number of the intersecting values to be determined.

25. A non-transitory computer-readable, medium comprises: instructions that, when executed by a processor, cause the processor to perform a method of tracing data flow, comprises:
profiling and classifying, by at least one processing device, domains based on features of columns containing data;
selecting a lineage analysis method, the selecting comprises:
when database tables for the domains include audit columns, selecting a timestamp-based lineage method;
when one of a semantic object and a column mapped to a single domain is present, selecting a stroboscopic-sampling based lineage method; and
when a lineage between a source schema and a target schema is to be ascertained, selecting a record-based lineage method;
executing the selected lineage analysis method; and
presenting lineage results.

* * * * *